B. PETRIK.
SPORTING GUN.
APPLICATION FILED MAY 26, 1920. RENEWED AUG. 10, 1922.
1,434,628.
Patented Nov. 7, 1922.
5 SHEETS—SHEET 3.
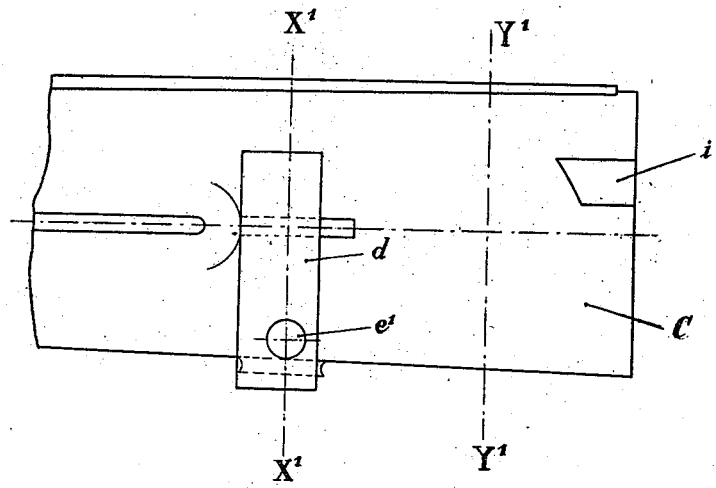
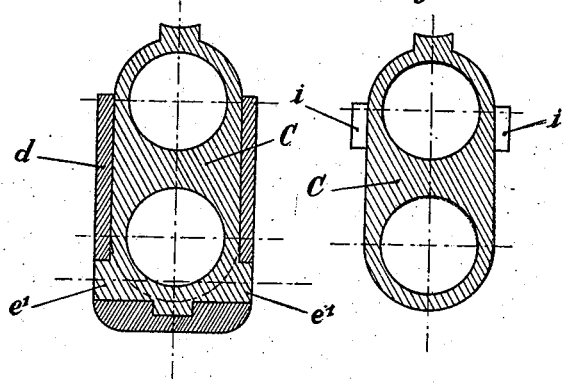
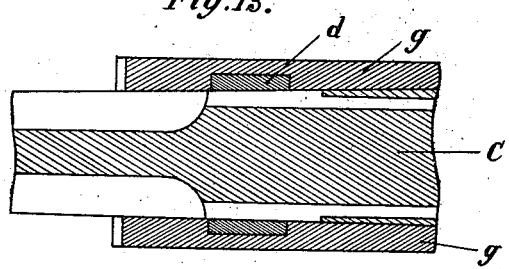
Inventor
Boniface Petrik

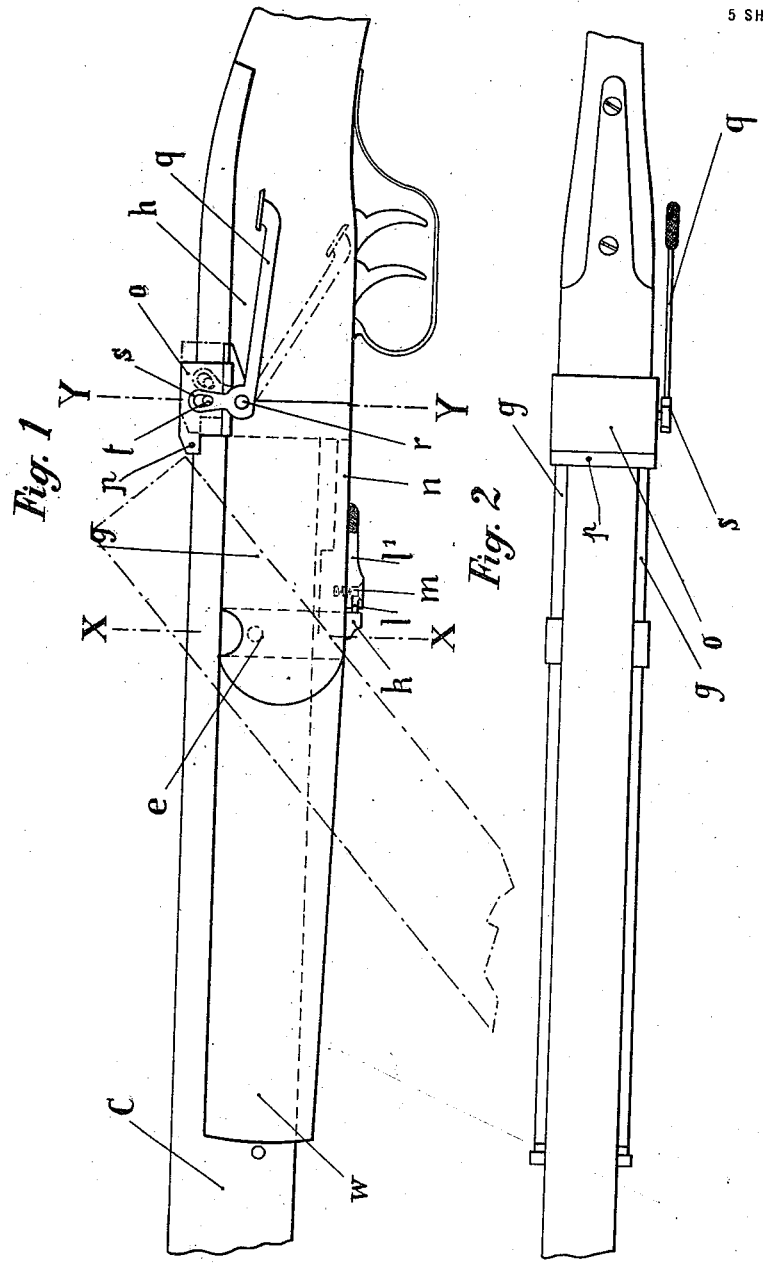

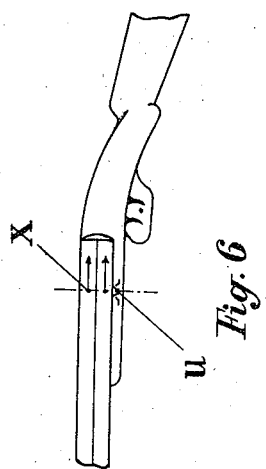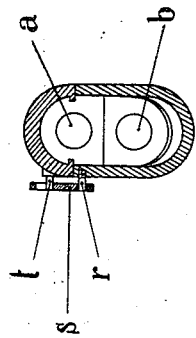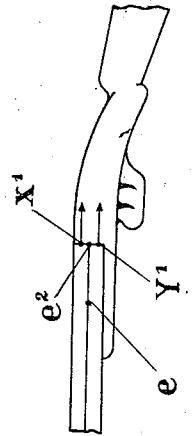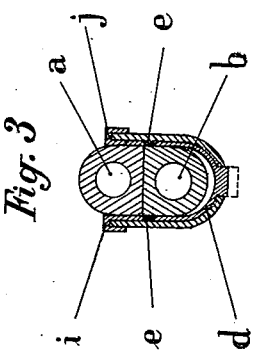

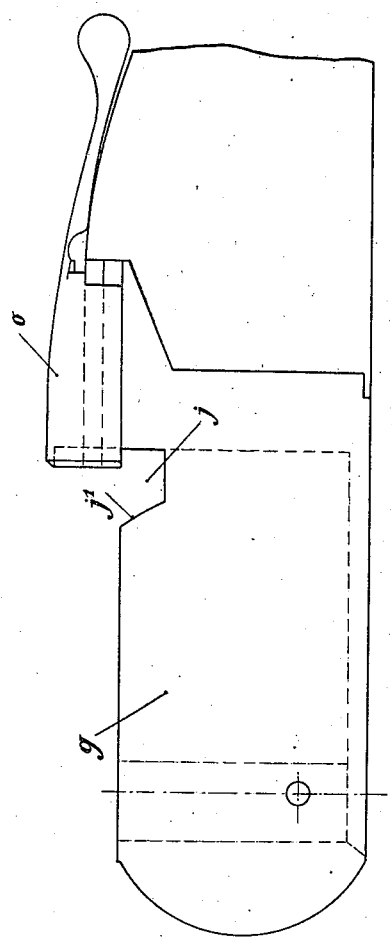

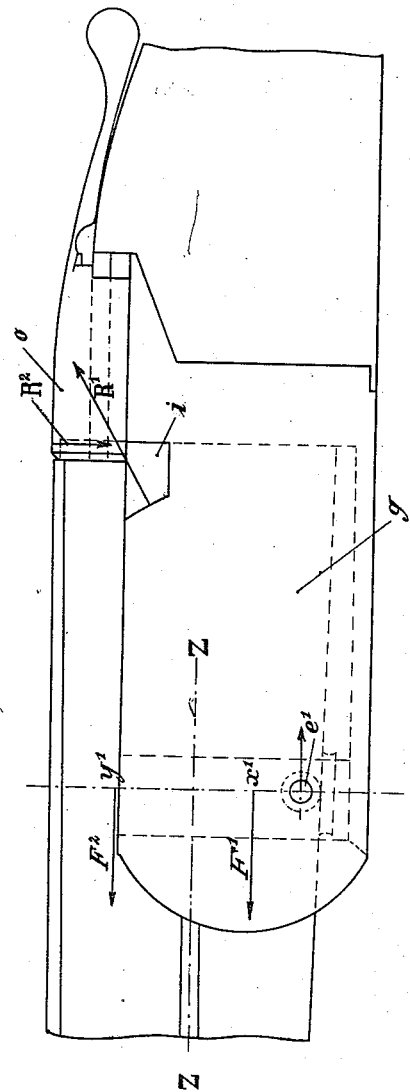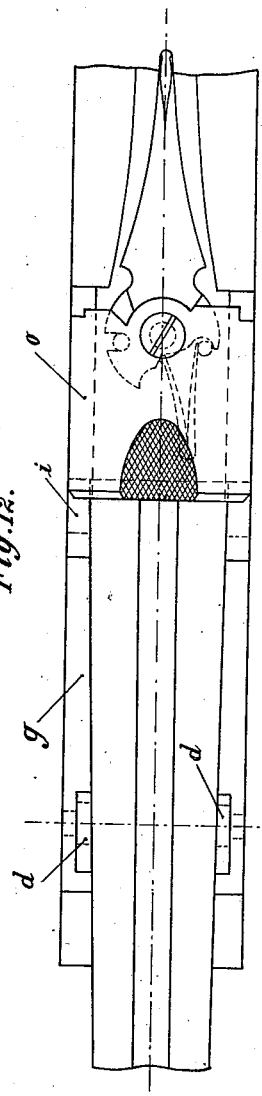

Patented Nov. 7, 1922.

1,434,628

UNITED STATES PATENT OFFICE.

BONIFACE PETRIK, OF ST.-ETIENNE, FRANCE, ASSIGNOR TO SOCIÉTÉ PETRIK & CIE., OF ST.-ETIENNE, FRANCE.

SPORTING GUN.

Application filed May 26, 1920, Serial No. 384,378. Renewed August 10, 1922. Serial No. 581,015.

*To all whom it may concern:*

Be it known that I, BONIFACE PETRIK, a citizen of the French Republic, residing at 79 Rue Horace Vernet, St.-Etienne, Loire, in the Republic of France, have invented certain new and useful Improvements in Sporting Guns; and I do hereby declare the following to be a full, clear, and exact description of the invention, such as will enable others skilled in the art to which it appertains, to make and use the same, reference being had to the accompanying drawings, and to letters or figures of reference marked thereon, which form a part of this specification.

Sporting guns are known in which two barrels are arranged one below the other and are connected to the breech by hooks or catches provided under the lower barrel engaging with a locking device carried by the fixed break-off portion of the breech.

This arangement presents the great disadvantage that after the first shot, corresponding to the firing of the upper barrel, the catches are put under a considerable bending strain resulting from the fact that the axes of the said barrel and the catches are relatively displaced or out of line.

Further, the gun, on account of this displacement or false alignment, is badly balanced, which destroys the accuracy of the aim.

Finally, in this kind of gun, as in ordinary guns with the barrels side by side, an escape of gas is always produced on the discharge of the shot between the rear ends of the barrels and the breech.

In order to overcome these disadvantages the Applicant has invented the following improvements which comprise:—

1. The suppression of the false alignment or displacement by placing the connecting arrangement between the block of the barrels and the breech laterally, that is to say, on each side of the block of the barrels, and not below the lower barrel (as was the case with the catches).

2. A connecting arrangement comprising a pivot formed by two lateral axes or pivots in one piece with the barrel block and engaging in two side cheeks secured to the breech, a strap in which the pivots turn being arranged between the pivots and the breech, said strap being held in grooves or recesses formed in the interior of the side cheeks, a sliding closure bolt being provided on the upper part of the breech for engaging above the rear end of the upper barrel and preventing the barrel block from rocking.

3. The arrangement at the front of the breech of lateral extensions or side cheeks forming the break-off, inside which the strap pivoted on the assemblage of the barrels is carried, with the object of almost completely enclosing the rear end of the block of the barrels, thus preventing the escape of gas when both barrels are fired.

The following description taken in conjunction with the accompanying drawings shown by way of example will enable the improvements to be well understood.

Fig. 1 is a side view of the improved gun.

Fig. 2 is a plan view thereof.

Fig. 3 is a section on the line XX of Fig. 1.

Fig 4 is a section on the line YY of Fig. 1.

Fig. 5 is a diagram showing how the bending forces act on on the arrangement for securing the barrel to the breech.

Fig. 6 shows the same forces acting on a gun of known type having catches under the lower barrel and the displacement of false alignment which results from the space between the catches and the axis of the upper barrel.

Fig. 7 is a side view of the rear end of a barrel block showing a modification of the method of securing to the breech.

Fig. 8 shows the breech in elevation.

Figs. 9 and 10 are sections on lines X'X' and Y'Y' respectively in Fig. 7.

Fig. 11 is a side elevation of a portion of a gun having the modified method of securing to the breech applied thereto, and Fig. 12 is a plan view thereof.

Fig. 13 is a horizontal section on line Z—Z, Fig. 11.

As shown in the drawings, the two barrels $a$, $b$ are superposed and assembled so as to form a single piece or block $c$ on which the strap $d$ is jointed; the axis of the joint may, for example, be formed by projections or lateral shoulders $e$ on the body of the barrel about which the said strap turns, said strap thus being secured to both barrels but able to pivot in relation to them.

This strap engages in grooves provided on the inner walls of two lateral extensions or side cheeks $g$ formed with the breech or stock $h$. The upper ends of the strap are curved at $i$, $j$ in order to fit over the upper edges of said extensions as shown in Fig. 3. The lower end $k$ of the strap is clamped by the grip of the cam shaped end $l$ of a small lever or key $l'$ pivoting about the screw $m$ which connects it to the breech, or more exactly to the lower wall $n$ which connects the two sides $g$ and which forms the portion known as the break in sporting guns. By disengaging the key the barrels can be separated from the breech.

At the top part and in front of the breech $h$ a bolt $o$ is mounted, the nose $p$ of which engages above the rear end of the upper barrel and prevents rocking about the joint $e$. This is the firing position of the gun.

In order to load, the sliding bolt $o$ is pulled rearwards as shown in dotted lines, the nose $p$ effecting its disengagement from the end of the barrel which is thus free to rock and can be brought into the position shown in dotted lines in Fig. 1. The pulling back of the bolt $o$ may be effected, for example by a lever $q$ pivoted at $r$, the end $s$ of which engages a pin $t$ fixed to the bolt $o$. Fig. 1 also shows in dotted lines the lever $q$ lowered for pulling back the bolt $o$.

It will be understood that the replacing of the known catches $u$ (see Fig. 6) by a joint $e$ (see Fig 5) provided on the barrel block substantially at the middle thereof, and by a bolt $o$, lessens the false alignment or displacement particularly for the upper barrel represented by the distances $u$ $x$ for the known guns and by the distances $e^2$ $x'$ and $e^2$ $y'$ for the gun which is the object of the present invention.

Practically the arms of levers represented by $e^2$ $x'$ and $e^2$ $y'$ are so small that the bending effort in the vertical plane may be considered as negligible, which is a great advantage.

The gun is dismountable in three pieces as the usual guns are, that is to say it can be dismounted into the front part $w$, the breech $h$ and the barrels $c$.

Further, since the joint $e$ is higher up than the known catches $u$, as it is practically midway between instead of under the barrels, the inclination which has to be given to the barrels for loading purposes is considerably less than in the usual guns.

In the modification shown in Figs. 7-13, the barrel block C has an axis or pivot $e'$ about which the strap $d$ oscillates. This strap is held in two grooves or recesses formed in the inside of the side cheeks of the breech as shown in section Fig. 13. The pivot $e'$ instead of being almost midway between the barrels is lower and may even be placed below the longitudinal axis of the lower barrel.

But in this case a supplementary support is provided formed by a lug or part $i$ on each side of the barrel block adapted to engage in an opening $j$ in each side cheek $g$ of the breech. When the gun is ready to fire the rear end of the barrel is covered by a sliding bolt $o$.

Under these conditions, considering the forces acting on the pivot of the assemblage of the barrels with the breech on the firing of a shot, which tend to force the barrel away from the breech, supposing the latter to be held fixed it will be seen that:—

1. In the lower barrel, the force F' passes practically through the pivot forming the connection between the barrel and the breech, the said pivot being almost in the longitudinal axis of the lower barrel ($e'$ $x'$ being nearly zero).

2. For the upper barrel the forcing effort $F^2$ is practically neutralized by the reaction R' of the lugs $i$ on the faces $j'$ of the openings $j$ in the sides $g$ of the breech and by the reaction $R^2$ of the bolt $o$ which covers the rear end of the barrel block.

This arrangement also has the advantage that the pivot point being very low it may be brought near to the ends of the barrels, that is to say near the breech, without destroying the rocking or breaking movement, which allows the length of the break off portion to be diminished and produces a lighter gun.

It will be understood that the present invention is not limited to the method of carrying it out which has been described and illustrated by way of example only, and that various modifications may be made without departing from the spirit of the invention. In particular, the position of the joints $e$ or $e'$ may be modified for example slightly lowered or raised.

Further, these improvements may be applied to guns of all kinds.

Having thus described the nature of the said invention and the best means I know of carrying the same into practical effect, I claim:

1. In a drop barrel breech loading gun and in combination a barrel block, side pivots on said block, a strap with bearings for said pivots, a breech, and two side extensions on said breech surrounding said strap.

2. In a drop barrel breech loading gun and in combination a barrel block, side pivots on said block, a breech, two side extensions on said breech, grooves on the inner sides of said extensions and a strap having bearings for the pivots on the barrel block mounted in said grooves.

3. In a drop barrel breech loading gun and in combination a barrel block, side pivots on said block, a breech, two side extensions on said breech, grooves on the inner sides of said extensions, a strap having bearings for the pivots on the barrel block mounted in said grooves, side lugs on the barrel block near the rear ends of the barrels, and recesses formed in the side extensions on the breech for engaging said lugs.

4. In a drop barrel breech loading gun and in combination, a barrel block, side pivots on said block at points below the longitudinal axis of the lowest barrel, a breech, two side extensions on said breech, grooves on the inner sides of said extensions, a strap having bearings for the pivots on the barrel block mounted in said grooves, side lugs on the barrel block near the rear ends of the barrels and recesses formed in the side extensions on the breech for engaging said lugs.

5. In a drop barrel breech loading gun and in combination a barrel block, side pivots on said block, a strap with bearings for said pivots, a breech, two side extensions on said breech surrounding said strap and a sliding closure bolt mounted on the breech and adapted to engage the rear end of the barrels.

6. In a drop barrel breech loading gun and in combination a barrel block, side pivots on said block, a breech, two side extensions on said breech, grooves on the inner sides of said extensions, a strap having bearings for the pivots on the barrel block mounted in said grooves and a sliding closure bolt mounted on the breech and adapted to engage the rear end of the barrels.

7. In a drop barrel breech loading gun and in combination a barrel block, side pivots on said block, a breech, two side extensions on said breech, grooves on the inner sides of said extensions, a strap having bearings for the pivots on the barrel block mounted in said grooves, side lugs on the barrel block near the rear ends of the barrels, recesses formed in the side extensions on the breech for engaging said lugs and a sliding closure bolt mounted on the breech and adapted to engage the rear end of the barrels.

8. In a drop barrel breech loading gun and in combination, a barrel block, side pivots on said block at points below the longitudinal axis of the lowest barrel, a breech, two side extensions on said breech, grooves on the inner sides of said extensions, a strap having bearings for the pivots on the barrel block mounted in said grooves, side lugs on the barrel block near the rear ends of the barrels, recesses formed in the side extensions on the breech for engaging said lugs, and a sliding closure bolt mounted on the breech and adapted to engage the rear end of the barrels.

9. A drop barrel breech loading gun having a block containing the barrels provided with side pivots below the longitudinal axis of the lowest barrel, said pivots engaging a strap carried by the breech, side lugs being also provided on the barrel block which engage with openings formed in a portion of the breech, the latter also carrying a sliding closure bolt which engages the rear end of the barrels, substantially as described.

In testimony that I claim the foregoing as my invention, I have signed my name.

BONIFACE PETRIK. [L. S.]

Witnesses:
F. BOXBERGER,
C. BEYRE.